(12) United States Patent
Hung

(10) Patent No.: US 7,288,185 B2
(45) Date of Patent: Oct. 30, 2007

(54) MAGNETIC ENERGY WAVE DEVICE

(76) Inventor: Chien-Ku Hung, 9F, No. 68, Chung Cheng Rd., Hsinchuang City, Taipei Hsien (TW)

( * ) Notice: Subject to any disclaimer, the term of this patent is extended or adjusted under 35 U.S.C. 154(b) by 380 days.

(21) Appl. No.: 10/976,808

(22) Filed: Nov. 1, 2004

(65) Prior Publication Data

US 2005/0098486 A1 May 12, 2005

(30) Foreign Application Priority Data

Nov. 7, 2003 (TW) .............................. 92219812 U

(51) Int. Cl.
*C02F 1/48* (2006.01)
(52) U.S. Cl. .................. 210/97; 210/143; 210/222; 210/223; 210/243; 204/661; 204/665
(58) Field of Classification Search .................. 210/97, 210/149, 222, 223, 243, 695, 743, 748; 204/660, 204/661, 665, 554, 555
See application file for complete search history.

(56) References Cited

U.S. PATENT DOCUMENTS 4,226,720 A * 10/1980 Brigante ..................... 210/222
4,879,045 A * 11/1989 Eggerichs ................... 210/223
5,637,226 A * 6/1997 Adam et al. ................ 210/222

FOREIGN PATENT DOCUMENTS

TW 40881 4/1999

OTHER PUBLICATIONS

PTO 07-2086-Translation of R.O.C. Patent No. 408,811.*

* cited by examiner

*Primary Examiner*—David A Reifsnyder
(74) *Attorney, Agent, or Firm*—Rosenberg, Klein & Lee

(57) ABSTRACT

A magnetic energy wave device has a winding spiral pipe, a magnetic conductive metal layer, a hollow coil holder, and a circuit board. A magnetic switch is assembled at a water inlet of the winding spiral pipe. The magnetic conductive metal layer is sleeved outside the winding spiral pipe. The winding spiral pipe and the magnetic conductive metal layer are assembled in the hollow coil holder. A coil is wound around the hollow coil holder. The circuit board is connected to an external power source, and is electrically connected to the magnetic switch and the coil. When water passes through the water inlet, the magnetic switch connects the power source and the coil. The coil and the magnetic conductive metal layer therefore produce dynamic magnetic fields to magnetize fully water in the pipe.

6 Claims, 5 Drawing Sheets

MAGNETIC ENERGY WAVE DEVICE

BACKGROUND OF THE INVENTION

1. Field of the Invention

The present invention relates to a magnetic energy wave device and, more particularly, to a magnetic energy wave device making use of coils to induce dynamic magnetic fields.

2. Description of Related Art

Water is an essential element in human life. Because the cleanness of a water source may be affected due to the environmental pollution, it is necessary to first purify and filter drinking water for safe use. After water is magnetized by magnetic fields, magnetized water can be obtained. Magnetized water can activate cells, maintain weak alkaline constitution of human bodies, restrain the growth of bacteria, prevent generation of limescale, and sweeten the taste of water, and therefore is much appreciated by many people.

As for generators of magnetized water, R.O.C. Patent No. 408811 (certificate No. 164,556) discloses a resonant magnetic field water heater, in which a coil holder is assembled with a stainless steel water disk to accomplish magnetization of water, hence improving the quality of drinking water.

Although the above resonant magnetic field water heater can magnetize water, the assembly of the coil holder and the stainless steel water disk can further be improved to accomplish greater magnetization of water.

Accordingly, the above conventional magnetized water generator has inconveniences and drawbacks in practical use. The present invention aims to propose a magnetic energy wave device to solve the above problems in the prior art.

SUMMARY OF THE INVENTION

An object of the present invention is to provide a magnetic energy wave device to accomplish greater magnetization of water and a more efficient arrangement of pipes where water flows through.

To achieve the above object, the present invention provides a magnetic energy wave device, which comprises a winding spiral pipe, a magnetic conductive metal layer, a hollow coil holder, and a circuit board. A magnetic switch is assembled at a water inlet of the winding spiral pipe. The magnetic conductive metal layer is sleeved outside the winding spiral pipe. The winding spiral pipe and the magnetic conductive metal layer are assembled in the hollow coil holder. A coil is wound around the hollow coil holder. The circuit board is connected to an external power source, and is electrically connected to the magnetic switch and the coil.

When water passes through the water inlet, the magnetic switch connects the power source and the coil. The coil and the magnetic conductive metal layer therefore produce dynamic magnetic fields to magnetize fully water in the pipe sleeved inside the magnetic conductive metal layer. Moreover, the space arrangement of the winding spiral pipe is more efficient.

BRIEF DESCRIPTION OF THE DRAWINGS

The various objects and advantages of the present invention will be more readily understood from the following detailed description when read in conjunction with the appended drawing, in which.

DETAILED DESCRIPTION OF THE PREFERRED EMBODIMENTS

Figure 1:
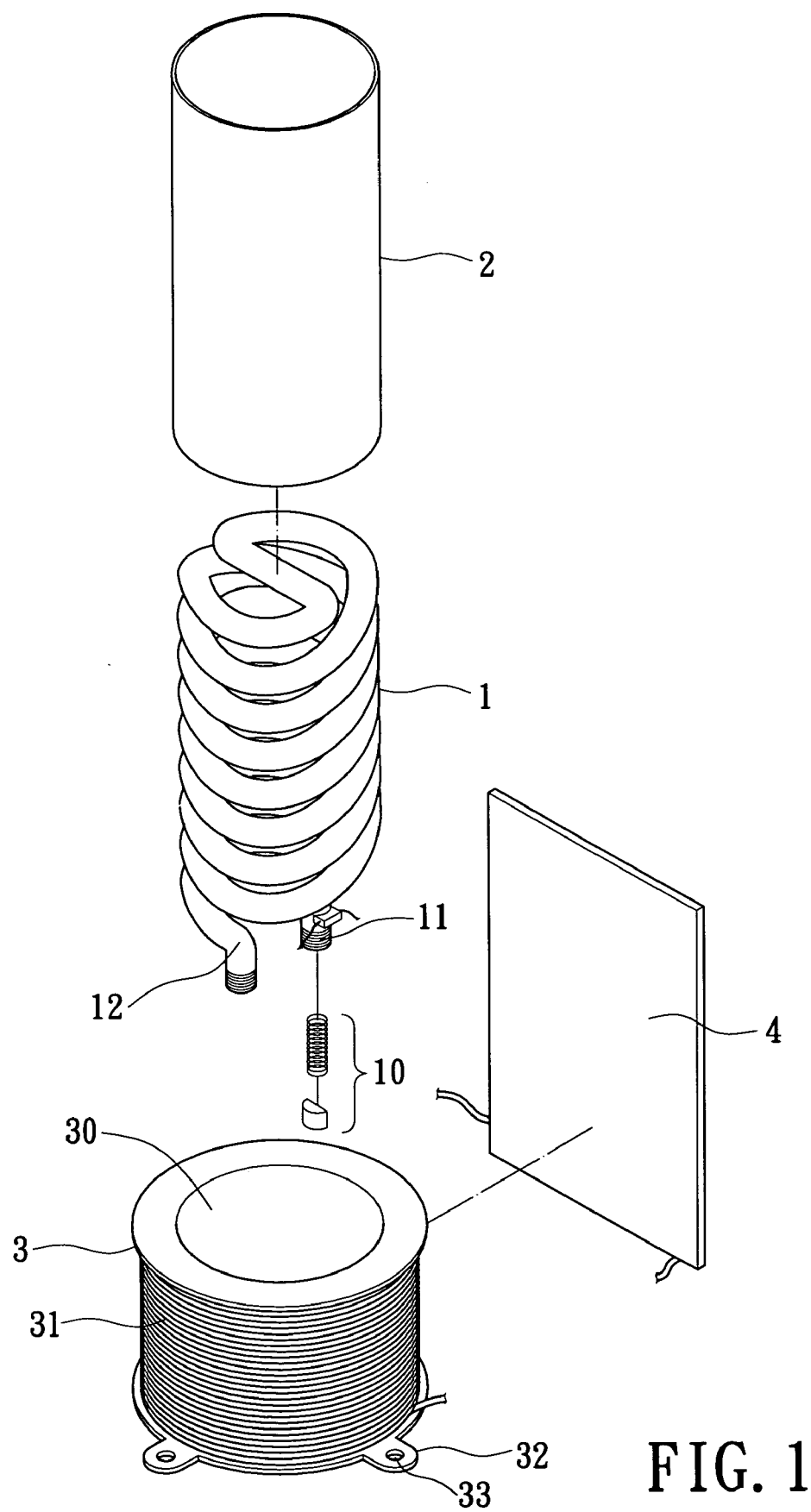
FIG. 1 is an exploded perspective view of the present invention.
Figure 2:
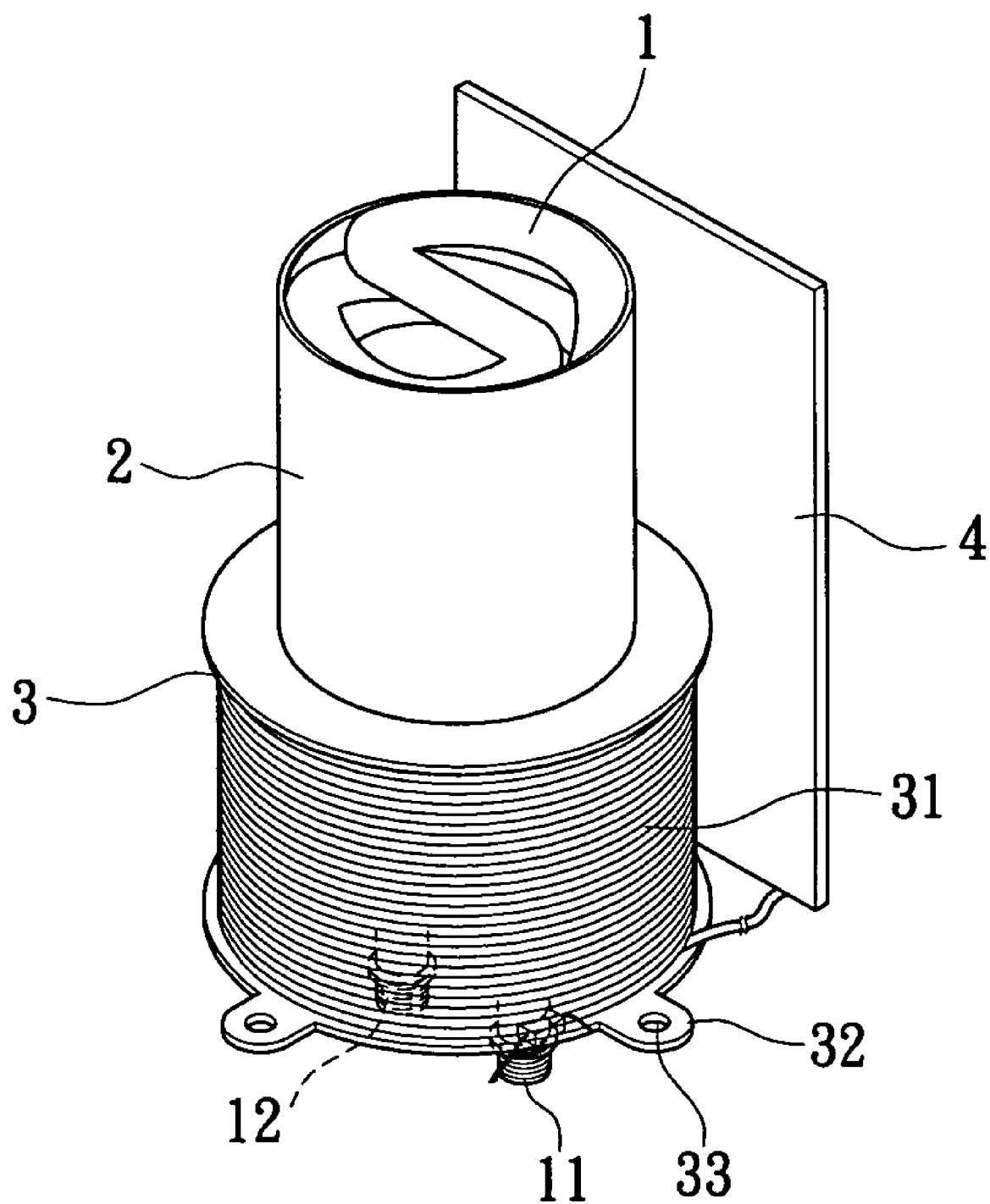
FIG. 2 is a perspective assembly view of the present invention.
Figure 3:
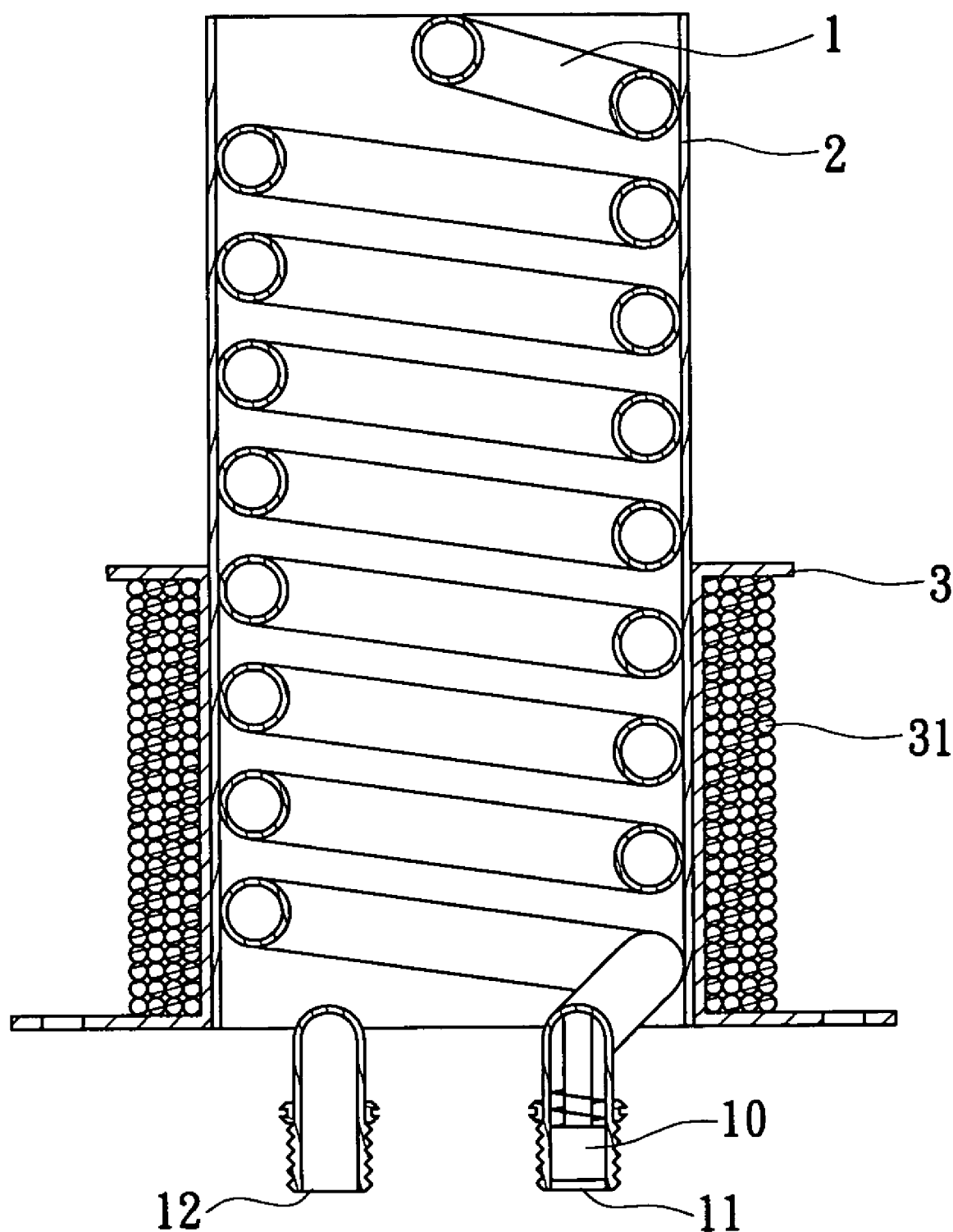
FIG. 3 is a cross-sectional side view of the present invention.

As shown in FIGS. 1 to 3, a magnetic energy wave device of the present invention comprises a winding spiral pipe 1, a magnetic conductive metal layer 2, a hollow coil holder 3, and a circuit board 4. The winding spiral pipe 1 has a water inlet 11 and a water outlet 12. A magnetic switch 10 is assembled at the water inlet 11. The winding spiral pipe 1 can be a plastic pipe, a ceramic pipe, a copper pipe, or a stainless steel pipe.

The magnetic conductive metal layer 2 is sleeved outside the winding spiral pipe 1.

An accommodation room 30 is formed in the hollow coil holder 3. The winding spiral pipe I and the magnetic conductive metal layer 2 are assembled in the accommodation room 30. The water inlet 11 and the water outlet 12 are led out of the hollow coil holder 3. A coil 31 is wound around the hollow coil holder 3.

The circuit board 4 is connected to an external power source, and is electrically connected to the magnetic switch 10 and the coil 31.

When water passes through the water inlet 11, the magnetic switch 10 is driven to conduct the power source and the coil 31. The coil 31 causes magnetic induction so that the coil 31 and the magnetic conductive metal layer 2 produce dynamic magnetic fields to magnetize fully water in the pipe 1. When the water flow is turned off, the magnetic switch 10 automatically cuts off the power source.

When the coil 31 and the power source is on, the temperature of the water will rise. An overheat protector (not shown) can further be disposed on the circuit board 4 to cut off automatically the power source when it detects that the water temperature exceeds a preset temperature value (e.g., 65° C.).

Figure 4:
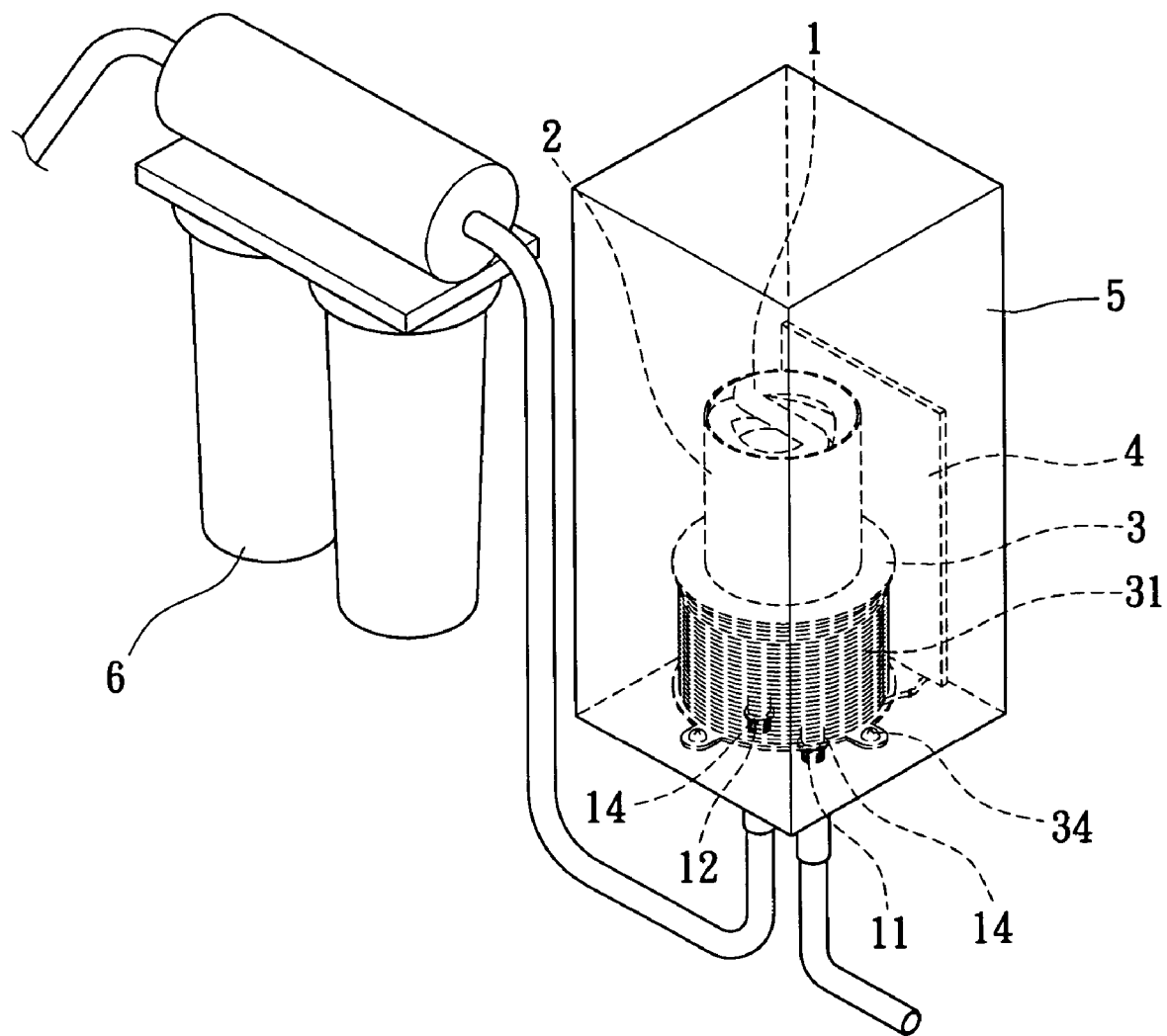
FIG. 4 is a perspective view of the present invention matched with a water filter.

Reference is made to FIG. 4. The magnetic energy wave device of the present invention further comprises a housing 5. A positioning leaf 32 is protrusively disposed at a bottom edge of the hollow coil holder 3. The positioning leaf 32 has a fixing hole 33. A fixing piece 34 penetrates through the fixing hole 33 and is fixed in the housing 5. The circuit board 4 is fixed in the housing 5 by means of screw bolts (not shown) or fasteners (not shown). The water inlet 11 and the water outlet 12 are led out of the housing 5 with seal rings 14 being assembled between the housing 5 and them, respectively. The water outlet 12 is further connected externally to a water inlet of a water filter 6. The magnetic energy wave device of the present invention can separately match the water filter 6 to enhance the quality of drinking water.

Figure 5:
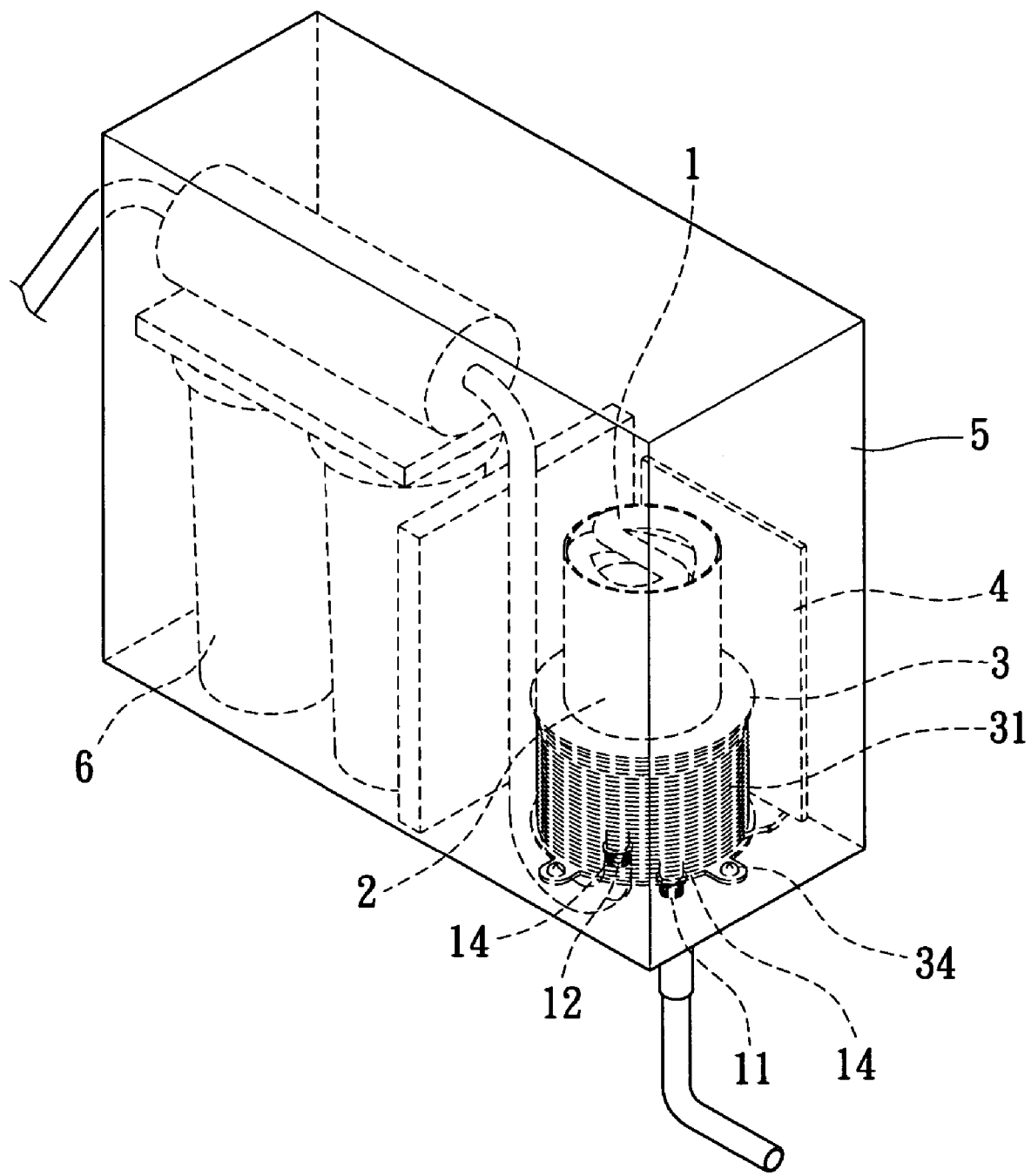
FIG. 5 is a perspective view of the present invention matched with another water filter.

Reference is made to FIG. 5. A water filter is assembled in the housing 5 to form an integral assembly for water filtering and purification, hence providing a more perfect effect.

To sum up, the magnetic energy wave device of the present invention has the following characteristics.

1. The winding spiral pipe is sleeved inside the magnetic conductive metal layer and assembled in the hollow coil holder so that water flowing in the pipe can be more easily and fully magnetized.

2. The layered installation of the winding spiral pipe, the magnetic conductive metal layer, and the hollow coil holder makes magnetization of water and the space arrangement more efficient.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

I claim:

1. A magnetic energy wave device, comprising:

a winding spiral pipe for allowing water flow there through, said winding spiral pipe having a water inlet and a water outlet;

a magnetic switch positioned at said water inlet;

a magnetic conductive metal layer sleeved outside said winding spiral pipe;

a hollow coil holder with an accommodation room formed therein, said winding spiral pipe and said magnetic conductive metal layer being assembled in said accommodation room, said water inlet and said water outlet being led out of said hollow coil holder, and a coil being wound around said hollow coil holder; and a circuit board connected to an external power source and electrically connected to said magnetic switch and said coil;

whereby when water passes through said water inlet, said magnetic switch connects the power source and said coil so that said coil and said magnetic conductive metal layer produce dynamic magnetic fields to magnetize fully water in said pipe.

2. The magnetic energy wave device as claimed in claim 1, wherein said winding spiral pipe is a plastic pipe, a ceramic pipe, a copper pipe, or a stainless steel pipe.

3. The magnetic energy wave device as claimed in claim 1, wherein a positioning leaf is protrusively disposed at a bottom edge of said hollow coil holder, and said positioning leaf has a fixing hole.

4. The magnetic energy wave device as claimed in claim 1, further comprising a housing, said fixing hole of said hollow coil holder penetrating through and being fixed in said housing, said circuit board being fixed in said housing, said water inlet and said water outlet being led out of said housing, and seal rings being assembled between said water inlet and said water outlet and said housing, respectively.

5. The magnetic energy wave device as claimed in claim 1, wherein an overheat protector is further disposed on said circuit board to cut off the power source when the overheat protector detects water temperature in excess of a preset temperature value.

6. The magnetic energy wave device as claimed in claim 1, wherein said water outlet of said winding spiral pipe is further connected externally to a water inlet of a water filter.

* * * * *